Dec. 20, 1949  H. ZWERLING  2,491,700
BRACED CONDUIT CONSTRUCTION
Filed Nov. 10, 1945  2 Sheets—Sheet 1

INVENTOR.
HARRY ZWERLING
BY
Louis Barnett
ATTORNEY

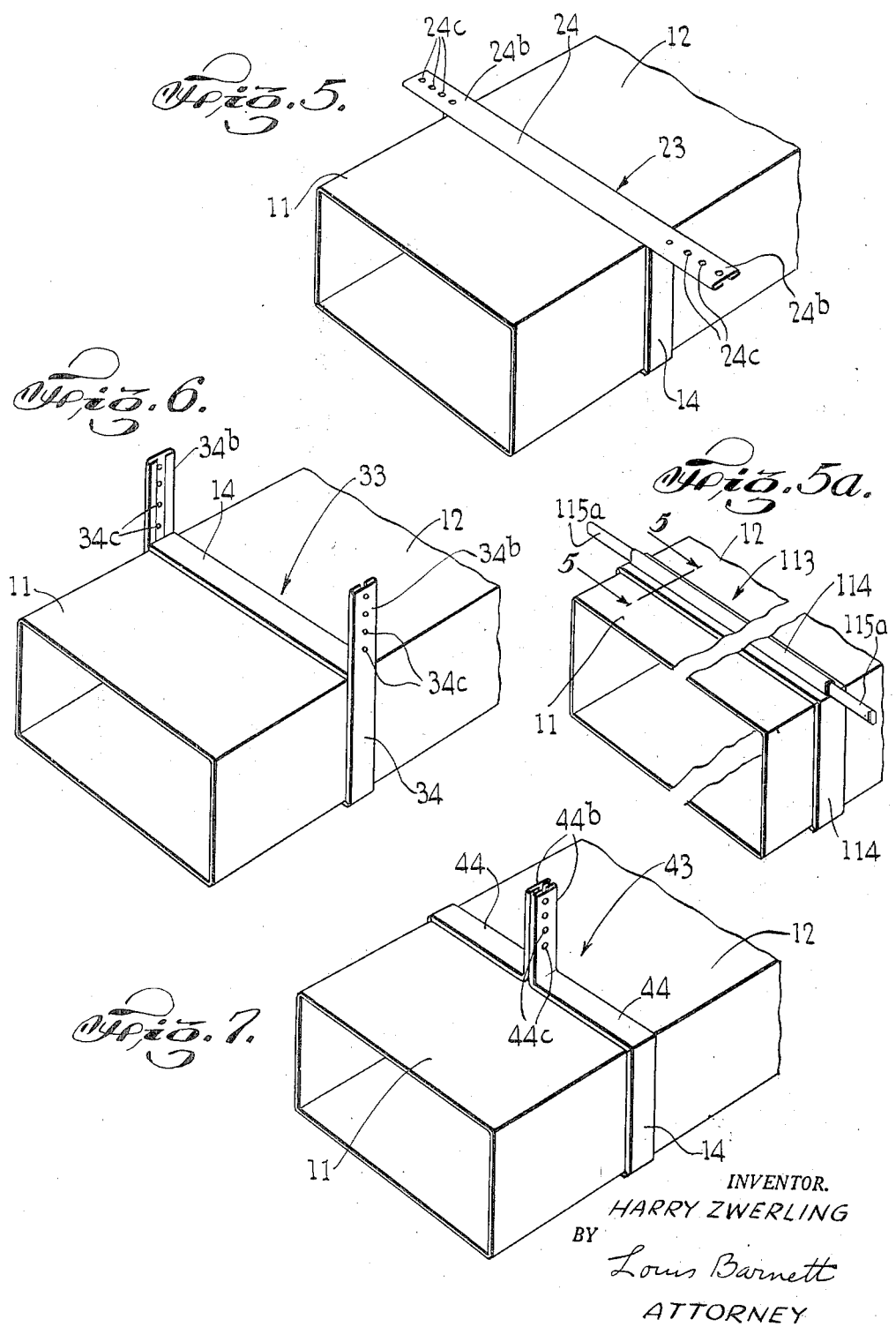

Patented Dec. 20, 1949

2,491,700

UNITED STATES PATENT OFFICE 2,491,700

BRACED CONDUIT CONSTRUCTION

Harry Zwerling, Brooklyn, N. Y.

Application November 10, 1945, Serial No. 627,904

14 Claims. (Cl. 285—201)

1

The invention relates to sheet metal art as used for air conditioning systems and the like. More particularly the invention is directed to an improved bracing connection construction for leakproof conduits and the like pipe installations which require smooth interior to eliminate loss due to friction of a flowing medium therethrough such as air.

Among the objects of the invention is to generally improve sheet metal constructions of the character described which shall comprise of few and simple parts that are readily assembled to form a rigid, non-sagging structure having leaktight joints and providing smooth non-obstructive interior surfaces to eliminate frictional loss due to flowing air or gas therethrough, and which shall be practical and efficient to a high degree in use.

Other objects and advantages will in part be obvious, and in part hereinafter pointed out.

The invention accordingly consists in features of construction, combination of elements, and arrangement of parts, which will be exemplified in the constructions hereinafter discussed of which a scope of the application will be indicated in the following claims.

In the accompanying drawings in which several possible embodiments of the invention are shown.

Fig. 4 is a cross-sectional view of a modified form of the improved braced joint corresponding to a cut taken on lines 5—5 in Fig. 5a.

Figs. 5, 6 and 7 are perspective views similar to Fig. 1 showing various forms of the invention for utilizing the improved braced joints to provide extension supporting means.

Fig. 5a is a fragmentary perspective view similar to Fig. 5 but showing a hanger extension construction when using the form of the invention corresponding to Fig. 4 and adapted to be used on relatively wide conduits for providing a reinforced transverse bracing to eliminate sagging.

Figure 1:
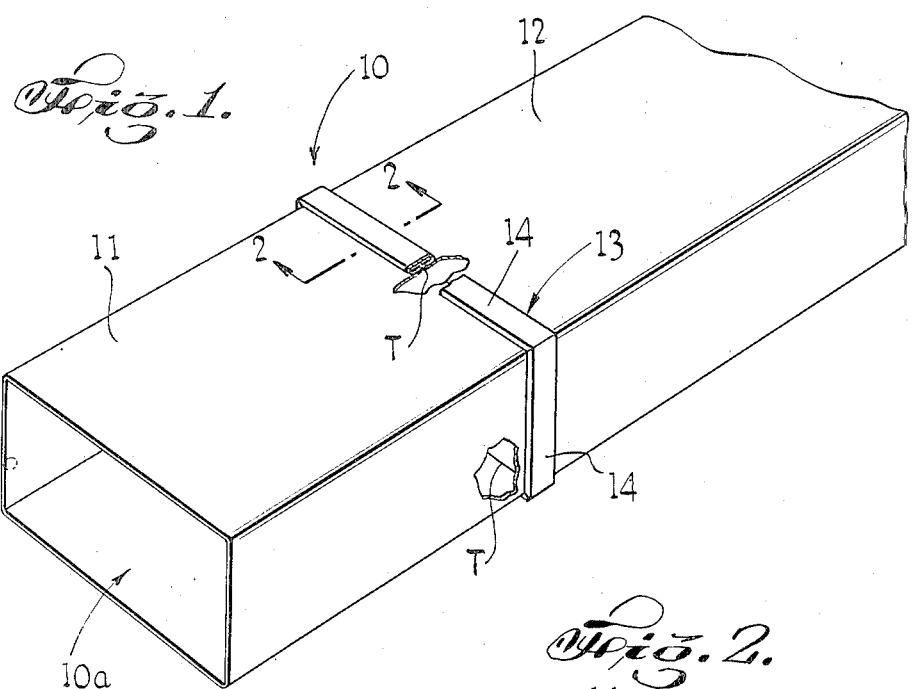
Fig. 1 is a perspective view showing connecting sections of a sheet metal braced conduits formed with obstructionless, smooth interior surfaces constructed to embody the invention, portions being broken away to show the improved joint and interior structure.

Referring in detail to Fig. 1 the drawing 10 denotes generally a conduit providing a passage

2 or flue 10a and formed of sections, two of which, 11 and 12 respectively, are shown interconnected by a braced leakproof joint 13 constructed to embody the invention.

The conduit 10 is of a relatively rigid tubular structure having straight side cross-sectional contour or configuration being for example, as here shown, rectangular, and may be constructed of suitable sheet metal welded or otherwise formed with continuous smooth interior surfaces for eliminating frictional losses due to the flow of air or other gases through the flue 10a of said conduit 10.

To furnish convenient means for installation, repairs and maintenance, the conduit 10 is sectionalized, as shown, by two or more of said sections 11 and 12 which are interconnected through joint 13 to provide a reinforced bracing construction which retains the interior surface relatively smooth and free from any obstructions to the passage of air or gases through the flue 10a.

Figure 2:
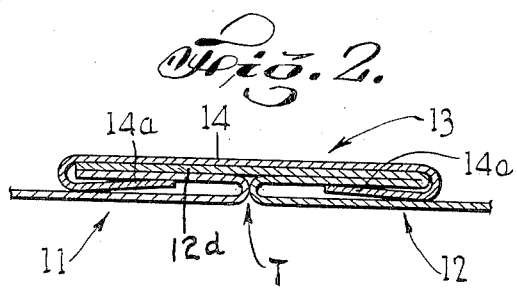
Fig. 2 is a cross-sectional view of the brace taken on lines 2—2 in Fig. 1.
Figure 3:
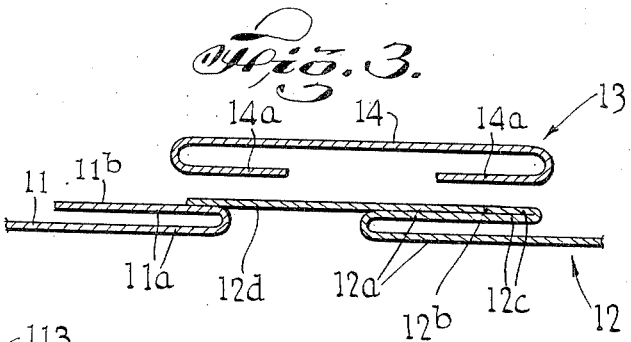
Fig. 3 is a cross-sectional view like Fig. 2 with the joint portion separated before assembly.

As seen from Figs. 1, 2 and 3 the joint 13 may be formed so as to be leakproof by providing the edge portion of section 11 along or forming said joint 13 with a single fold 11a having a turned back flange 11b of U-shaped cross-section, and the mating edge portion of section 12 forming said joint 13 being provided with a double fold 12a of S-shaped cross-section.

Said double S-shaped fold 12a has a first folded or turned back portion 12b which is similar in shape, proportion and size to turned back flange 11a and has an integral continuous second folded portion 12c bent into a closely overlying position having a free edge flange 12d thereof extending beyond said double fold 12a. Said joint 13 when assembled, as shown in Figs. 1 and 2 has the flange 12d superimposed to tightly abut against the turned back flange 11b of the U-shaped fold 11a provided on section 11.

To complete the joint 13 for retaining the single fold 11a of section 11 and the double fold 12a of section 12 in effective assembly and alignment an elongated bracing fastener plate, band or strip 14 is provided. Said strip 14 preferably is made of a thickness of sheet metal sufficient to form a relatively stiff, interlocking means and as here shown, has U-shaped, spaced, inturned edge flanges 14a extending lengthwise along opposite sides thereof. Said flanges 14a are made so that they retain a stiff slightly yieldable spring for compressing the joint assembly above described and as shown in Fig. 2. The joint 13 along one side has said edge flange 14a wedged between the upper side of section 11 and the under side of flange 11b of fold 11a firmly compressing and resiliently clamping the flange 11b tightly against the flange 12d of fold portion 12c, and along the other side has the other spaced flange 14a wedged between the upper side of section 12 and the under side of folded portion 12b firmly compressing and resiliently clamping said second fold 12c.

The practical operation of the invention is now apparent. When an installation of sectionalized conduit 10 is to be made like that shown in Fig. 1 there is provided on the ends of the section 11 and 12 the U-shaped single folded flange 11a and the S-shaped double folded flange 12a, respectively, and the fastener strip 14 is provided with the inturned flanges 14a as shown in Fig. 3, said fastening strip 14 being made substantially the length of the joint 13 along each exterior flat side of the conduit 10 as shown in Fig. 1.

The ends of the folds of flanges 11a and of 12a are then abutted to contact in alignment with the under surfaces of sections 11 and 12 to provide a smooth surface free from obstruction to the flow of air or vapors through said conduit flue 10a. The fastener strip 14 is then forced into position as shown in Figs. 1 and 2 and described above to complete the assembly of adjoining conduit sections. It will be noted that each completed joint 13 forms a rigid transverse bracing which retains the conduit against possible sagging of the conduit wall forming the flue 10a and provide means, namely the fastener strip 14, beyond the wall of the conduit flue 10a for attaching or hanging said conduit 10 to a support, as is clear from Figs. 5, 6 and 7, and hereinafter more fully described.

Figure 4:
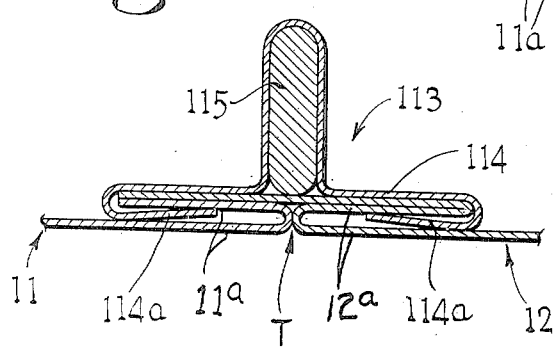

In Figs. 4 and 5a a modified construction of the invention is shown with joint 113. Here the conduit sections 11 and 12 are formed with U-fold flange 11a and S-fold flange 12a, respectively, like that shown in Figs. 1 and 2 and described above. As a joint fastener means, there is provided band or strip 114 which also has spaced longitudinally extending inturned edge flanges 114a, these being applied to clamp the joint 113 in the identical manner as described above of joint 13. Joint 113 however, differs from the latter by providing an additional reinforcing bar 115 which is retained by the fastening strip 114 preferably in a position over the flange extension 12d of the flange 12 so as to press against the latter and tends or acts to tighten the joint at T over where the folds of flanges 11a and 12a abut. The joint 113 is particularly suitable for relative wide conduits and when constructed with a rectangular shaped bar 115 and assembled with the width of said bar 115 aligned with the joint 113, there is provided a construction that is practically sagless.

The ends 115a of said bar 115 may be extended to provide supporting means for the conduit as shown in Fig. 5a.

In Figs. 5, 6 and 7 there is shown various constructions embodying the invention in which the bracing means is formed with extensions or parts for hanging or supporting the conduit. Thus the Fig. 5 bracing strip 24 is constructed and assembled in joint 23 for interconnecting the top side of conduit section 11 and 12 in the same manner as described above and shown in Figs. 1 to 3 but is terminated by integral outwardly extending end 24b having spaced holes 24c to secure said ends 24b to a support (not shown) in the well understood manner.

In Fig. 6 side bracing strips 34 of each assembled joint 33 forms part of the side interconnection for conduit sections 11 and 12 in the same manner shown in Figs. 1 and 3 but has integral upwardly extending ends 34b, each having spaced holes 34c for dependingly attaching to a suitable support or supports (not shown) in the well understood manner. The above construction is particularly suitable of relational wide and heavy installations.

In Fig. 7, the bracing means along the top side of the installation interconnecting sections 11 and 12 is formed by a pair of angle bracing strips 44 of joint 43, each in the manner shown in Figs. 1 and 3 but has integral upwardly projecting ends 44b brought to extend in close proximity which may be provided with aligning holes 44c for dependingly attaching to a suitable support (not shown) in the well understood manner. This construction may be used for relatively light installations.

It will thus be seen that there is provided a construction whereby the several objects of this invention are achieved and which are well adapted to meet the conditions of practical use.

As various other possible embodiments might be made of the above invention and as various changes might be made in the embodiments set forth, it is to be understood that all matters herein set forth or shown in the accompanying drawings are to be interpreted as illustrative and not in a limiting sense.

Having thus described my invention I claim as new and desire to secure by Letters Patent:

1. A conduit interconnecting joint of the character described comprising a single fold of U-shaped cross-section formed on an end of one conduit section having a turned back flange, a double fold of S-shaped cross-section formed on an end of an adjoining conduit section aligning with said single fold and in abutment, said double fold having an integral continuous free edge flange extending in a superimposed relation over said turned back flange on the exterior side of the first mentioned conduit section, and a fastener means interlocking said conduit sections ends and wedging said single and double folds with said integral free edge flange for clamping and compressing the joint assembly to form a reinforced bracing leakproof construction with a conduit interior passage free from seam joint parts between the sections to eliminate friction losses of a flowing medium passing from said first mentioned conduit section into said adjoining conduit section.

2. A conduit interconnecting joint as defined in claim 1 in which said conduit sections have exterior walls and said fastening means extending beyond said exterior walls to provide a support attachment.

3. A conduit interconnecting joint as defined in claim 1 in which said fastening means retains a reinforcing bar positioned to press against said free end flange over said abutment.

4. A conduit interconnecting joint as defined in claim 1 in which fastening means retains a reinforcing bar positioned to press against said free end flange, said bar having end extensions beyond the conduit to provide a support attachment.

5. A conduit interconnecting joint as defined in claim 1 in which said fastening means has angle extension ends formed to project from the conduit brought in close proximity to provide a support attachment.

6. A conduit of sheet material forming a flue of tubular sections, a reinforced bracing joint interconnecting the adjoining end of said sections in end to end relation for retaining the interior flue surfaces relatively smooth and free from obstructions to the passage of a gaseous medium from one section through to the adjoining section, said joint comprising a single fold of U-shaped cross-section having a turned back flange on one of said section ends mating with and against a double fold of S-shaped cross-section having an integral continuous free edge flange extending beyond said double fold and exterior of said interior flue surfaces so that said free edge flange is superimposed to abut on said turned back flange, and a fastener plate for each side of the conduit having inturned spaced edge flanges of stiff slightly yielding construction interlocking said joint along a side thereof by one of said plate edge flanges wedged between the upper side of one section end and the under side of said turned back flange for compressing and clamping the last mentioned flange to said free edge flange and interlocking said joint along the other side thereof by the other of said flange edges wedged to embrace portions of the double fold to provide a leakproof construction.

7. A conduit of sheet material forming a flue of tubular sections as defined in claim 6 having straight side cross-sectional configuration in which at least one of said fastener plates is provided with an extension beyond the conduit to provide a support attachment.

8. A conduit of sheet material forming a flue of tubular sections having straight side cross-sectional configuration as defined in claim 6 in which a pair of fastener plates with angle ends are provided on at least one side of the conduit, said angle ends being formed to project from the conduit and brought in close proximity to provide a support attachment.

9. A conduit of sheet material forming a flue of tubular sections having straight side cross-sectional configuration as defined in claim 6 in which said fastener plate embraces a reinforcing bar and presses the latter against said free edge flange for increasing said compressing and clamping of the turned back flange to said free edge flange.

10. A conduit of sheet material forming a flue of tubular sections having straight side cross-sectional configuration as defined in claim 6 in which said fastener plate embraces a reinforcing bar for increasing said compressing and clamping of the turned back flange to said free edge flange, said bar extending beyond the conduit to form a support attachment.

11. In a conduit construction of the character described having sections joined end to end, a reinforcing fastener plate for interlocking said section ends, said plate formed of sheet material of T-shaped cross-section having inturned spaced edge flanges of stiff yielding construction for wedge clamping said section ends together and a bracing bar extending lengthwise the plate and retained thereby to render the joint formed with said plate when assembled sagproof.

12. In a conduit construction forming a flue of the character described, a joint assembly having one section end terminated by a fold portion formed with an outturned flange and an adjoining section terminated by a double fold portion of S-shaped cross-section formed with an integral continuous free edge flange extending beyond said double fold and located to extend on an exterior side of the conduit, said free edge flange being superimposed on said outturned flange of the first mentioned section with the adjoining folded portion ends in joint abutment assembly to retain the interior flue surface smooth and free from all joint obstruction seams and for leakproofing said joint, and coupling means embracing said superimposed flanges for retaining said joint rigid transverse the length of the conduit construction.

13. A construction of the character described comprising an end to end coupling joint for adjoining tubular sections of a conduit, said joint having a peripherial single fold terminated by a flange on one section end and a peripherial double fold terminated by a flange having an extended portion on the adjoining section with the folds of said sections in abutment and said extended portion overlying the flange on the single fold, said extended portion being located on an exterior surface of the conduit to leave the interior surface of said conduit wholly free from the flanges, and an interlocking plate for embracing said flanges and extension portion for retaining and stiffening the coupling joint transverse the conduit.

14. The construction defined in claim 13 having means associated with said plate to provide a support attachment for the construction.

HARRY ZWERLING.

REFERENCES CITED

The following references are of record in the file of this patent:

UNITED STATES PATENTS

| Number | Name | Date |
| --- | --- | --- |
| 760,216 | Laws | May 17, 1904 |
| 976,029 | Birnbaum | Nov. 15, 1910 |
| 984,086 | Graham | Feb. 4, 1911 |
| 1,664,885 | Huenefeld | Apr. 3, 1928 |
| 1,693,428 | Atteberry et al. | Nov. 27, 1928 |
| 1,828,105 | Embree | Oct. 20, 1931 |
| 2,161,997 | Chapman | June 13, 1939 |